July 4, 1950

C. W. MOTT 2,513,955

LIFTING DEVICE FOR TRACTORS

Filed Dec. 11, 1944

Inventor:
Carl W. Mott.
By Paul O. Pippel
Atty.

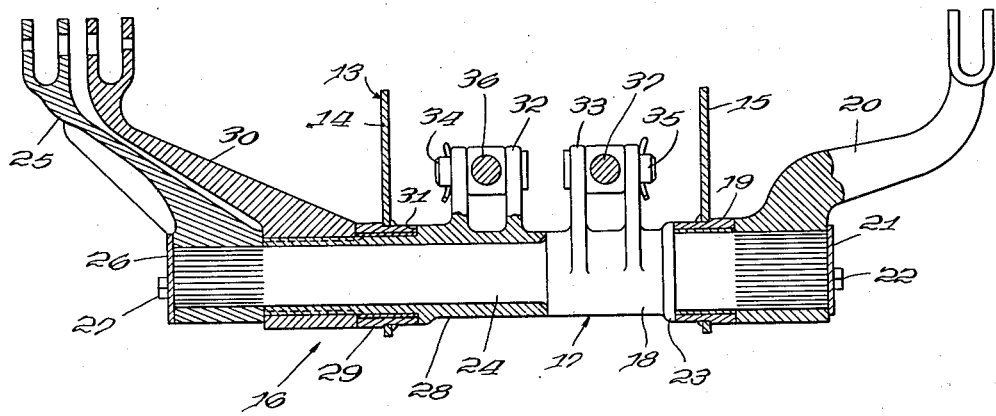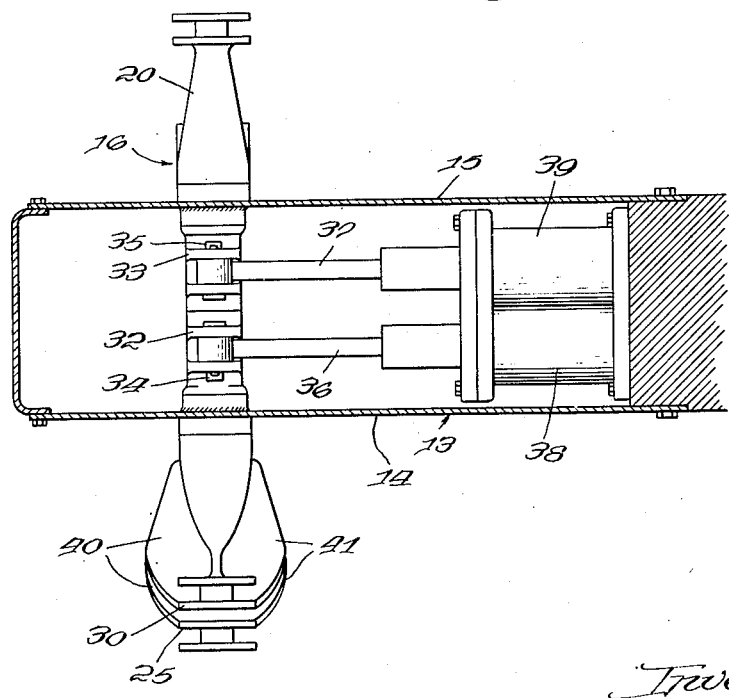

Patented July 4, 1950

2,513,955

UNITED STATES PATENT OFFICE 2,513,955

LIFTING DEVICE FOR TRACTORS

Carl W. Mott, La Grange, Ill., assignor to International Harvester Company, a corporation of New Jersey Application December 11, 1944, Serial No. 567,743

5 Claims. (Cl. 74—469)

This invention relates to lifting mechanism for agricultural implements. In United States Patent No. 2,368,156, a lifting mechanism is described including a transverse rock-shaft and a sleeve, independently rockable, and having arms secured to the ends thereof. The rock arms are positioned at the sides of the tractor for forward and rearward movement and are adapted to be connected to agricultural implements to effect raising and lowering thereof. The arms at each side of the tractor lie closely together and, being independently rockable to opposite sides of a vertical center-line drawn through the axes thereof, each has occasion to cross the path of the other when raising and lowering implements and the like. Since the rock-shaft and sleeve are power operated, preferably through the intermediary of double-acting hydraulic cylinders actuated from the tractor power plant, the rock arms function somewhat in the manner of powerful shears upon any object extending axially therebetween.

The danger of such an arrangement is obvious, and an object of the present invention is to provide means for rendering such arrangement innocuous.

Another object is to provide a novel rockable structure adapted to be incorporated in a tractive vehicle for moving implements relative thereto and having a plurality of rock arms thereon for connection to different implement parts for independent operation thereof.

Another object is to provide means filling the space between the rock arms when at opposite sides of a vertical center line through the axes thereof, such means acting as a shield against the axial insertion of objects between said arms.

A further object is to provide rock arms having lateral projections thereon extending in the direction of rocking movement thereof and adapted to overlap throughout the range of movement of said arms to fill the space therebetween.

Still another object is to provide rock arms having integral wings of such a conformation as to overlap throughout the range of rocking movement of said arms and prevent the axial insertion of objects therebetween.

Other objects and advantages will become clear from the following detailed description when read in conjunction with the accompanying drawings, wherein:

Figure 1 is a view in side elevation of the rear portion of a tractor having a longitudinally extending body 10, a transverse rear axle 11, and rear drive wheels 12, only one of which is shown.

Figure 2 is a section on line 2 of Figure 1 showing the construction of the transverse rock-shaft and sleeve.

Figure 3 is a section on line 3 of Figure 1 showing the shape of the rock arms provided for the rock-shaft and sleeve.

Figure 1:
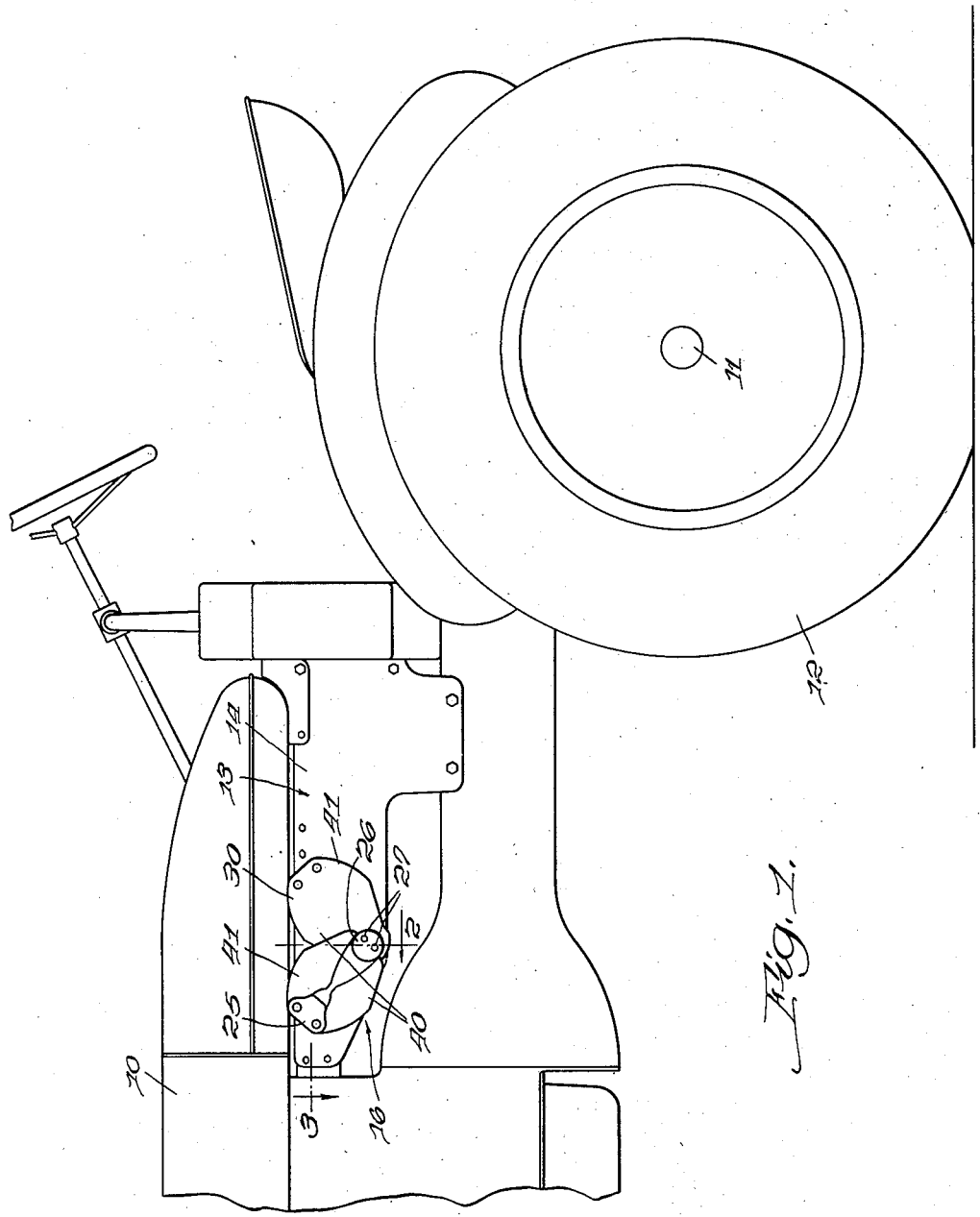

Secured to and forming a part of the tractor body 10 is a housing 13 having side walls 14 and 15. Mounted in the housing 13 is a rockable structure generally indicated at 16 adapted to function as a lifting and lowering mechanism for working tools mounted upon the tractor, as will become clear hereinafter.

Rockable structure 16 comprises a transversely extending shaft 17 having a portion 18 journaled in a bearing 19 in one wall 15 of the housing 13. The portion 18 projects laterally from one side of the tractor and has removably secured to the end thereof a rock arm 20 held against displacement by a cap 21 secured to the shaft by screws 22. The arm 20 abuts against the outwardly projecting end of bearing 19, the inner end of which bears against an enlargement 23 on the shaft portion 18 to prevent lateral displacement of the shaft.

Shaft 17 has a reduced portion 24, the end of which projects laterally from the wall 14 of housing 13, and is provided with a removable rock arm 25 held in place by a cap 26 secured to the shaft by one or more screws 27 seated in the shaft 17. Reduced portion 24 is surrounded by a sleeve 28, one end of which projects laterally from the wall 14 and is journaled in a bearing 29 therein. Outwardly projecting end of sleeve 28 terminates short of the end of shaft 17 and has removably secured to the end thereof a rock arm 30 in juxtaposition with rock arm 25. Arm 30 abuts against the outwardly projecting end of bearing 29, and the inner end of the latter bears against a shoulder 31 formed on the sleeve 28.

It should now be clear that, by rocking the shaft 17 and sleeve 28 independently, the rock arms 20, 25, and 30 may be moved about their axes forwardly and rearwardly with respect to the tractor, and the arms 20 and 25 may be rocked independently of the arm 30 so that, as stated before, the adjacent rock arms 25 and 30 may be moved to opposite sides of a vertical center line through the axes thereof, as clearly indicated in Figure 1. The mechanism by which this may be accomplished includes the arms 32 and 33 on the portions of the shaft 17 and sleeve 28 enclosed in the housing 13. The arms 32 and 33 are bifurcated and support in the ends thereof pins 34 and 35 respectively. Pivotally connected to the pins 34 and 35 are, respectively, the ends of pistons 36 and 37 of double-acting hydraulic cylinders 38 and 39 preferably actuated by the tractor power plant.

Each of the cylinders 38 and 39 is independently operated, and extension and retraction of the pistons 36 and 37 cause the rocking of the shaft 17 and the sleeve 28 carrying the rock arms 20, 25, and 30.

As pointed out before, the rock arms 25 and 30, being in juxtaposition and rockable to opposite sides of a vertical center line through the axes thereof, would constitute a danger if shaped, for example, in the conventional manner like the rock arm 20, which in this case operates alone on one side of the tractor. Were rock arms 25 and 30 constructed in the manner of rock arm 20, their proximity and their movement in opposite directions would exercise a substantial shearing effect upon any object thrust axially therebetween. In order to avoid such a contingency, the rock arms 25 and 30 have been shaped in a manner clearly shown in Figures 1 and 3 and are provided with wings 40 and 41. These wings are preferably integral with the arms, and when the arms 25 and 30 have rocked to opposite sides of a vertical center line therebetween, as indicated in Figure 1, these wings substantially overlap throughout the range of movement of the rock arms and thus prevent the insertion of objects axially therebetween.

From the foregoing description, the operation of the rockable lifting structure of the present invention should be clear. It should also be understood that modifications may be made in the form and arrangement of parts without departing from the spirit of the invention. Therefore, it is desired that the invention be limited only by the scope of the appended claims.

What is claimed is:

1. In a tractor to which may be attached an implement such as an earth-working tool or the like and having power means for moving the implement with respect to the tractor, a pair of rock arms pivoted coaxially on the tractor and connected to said power means for independent rocking movement to opposite sides of a center line transverse to the axes thereof, and an extension on at least one of said arms extending in the plane of rocking movement thereof and adapted to overlap the other arm in either position thereof when the arms have rocked to positions on opposite sides of said center line.

2. In a tractor to which may be attached an implement such as an earth-working tool or the like and having power means for moving the implement with respect to the tractor, a pair of rock arms pivoted coaxially on the tractor and connected to said power means for independent rocking movement to opposite sides of a center line transverse to the axes thereof, and wings on said arms extending in the plane of rocking movement thereof and adapted to overlap and occupy substantially all of the space therebetween in any relative position of said arms throughout the range of rocking movement thereof.

3. In a tractor to which may be attached an implement such as an earth-working tool or the like and having power means for moving the implement with respect to the tractor, a pair of rock arms pivoted coaxially on the tractor and connected to said power means for independent rocking movement to opposite sides of a center line transverse to the axes thereof, and wings integral with said arms extending in the plane of rocking movement thereof and adapted to overlap and occupy substantially all of the space therebetween in any relative position of said arms throughout the range of rocking movement thereof.

4. In a tractor to which may be attached an implement including independently operable working tools and having power means for moving the tools with respect to the tractor, a pair of rock arms pivoted coaxially on the tractor and connected to said power means for independent rocking movement in adjacent parallel planes to opposite sides of a vertical center line through the axes thereof, and means associated with said arms adapted to overlap and occupy substantially all of the space therebetween throughout the range of movement thereof, whereby axial insertion of objects between said arms is prevented.

5. In a tractor to which may be attached an implement including independently operable working tools and having power means for moving the tools with respect to the tractor, in combination, a transverse shaft on the tractor, a rock arm on at least one end of said shaft, a sleeve on said shaft, a rock arm on at least one end of said sleeve and in juxtaposition to the arm on said shaft, said arms being independently rockable to opposite sides of a vertical center line, and wings on said arms adapted to overlap and occupy substantially all of the space therebetween throughout the range of movement of said arms.

CARL W. MOTT.

REFERENCES CITED

The following references are of record in the file of this patent:

UNITED STATES PATENTS

| Number | Name | Date |
| --- | --- | --- |
| 1,037,631 | Jones | Sept. 3, 1912 |
| 1,283,893 | Ranz | Nov. 5, 1918 |
| 1,718,549 | Fellows | June 25, 1929 |
| 2,096,058 | O'Connor | Oct. 19, 1937 |
| 2,368,125 | Evans | Jan. 30, 1945 |
| 2,368,156 | Orelind et al. | Jan. 30, 1945 |

FOREIGN PATENTS

| Number | Country | Date |
| --- | --- | --- |
| 491,667 | Great Britain | Sept. 7, 1938 |